US012777514B2

(12) United States Patent
Perraud

(10) Patent No.: US 12,777,514 B2
(45) Date of Patent: Oct. 27, 2026

(54) FINE RANGING SLOT SCHEDULER

(71) Applicant: Qorvo US, Inc., Greensboro, NC (US)

(72) Inventor: Eric Perraud, Plaisance du Touch (FR)

(73) Assignee: Qorvo US, Inc., Greensboro, NC (US)

( * ) Notice: Subject to any disclaimer, the term of this patent is extended or adjusted under 35 U.S.C. 154(b) by 177 days.

(21) Appl. No.: 18/832,089

(22) PCT Filed: Feb. 21, 2023

(86) PCT No.: PCT/US2023/013473

§ 371 (c)(1),
(2) Date: Jul. 22, 2024

(87) PCT Pub. No.: WO2023/163924

PCT Pub. Date: Aug. 31, 2023

(65) Prior Publication Data

US 2025/0106884 A1 Mar. 27, 2025

Related U.S. Application Data

(60) Provisional application No. 63/369,110, filed on Jul. 22, 2022, provisional application No. 63/312,990, filed on Feb. 23, 2022.

(51) Int. Cl.
*H04W 72/543* (2023.01)
*H04W 28/02* (2009.01)
*H04W 72/0446* (2023.01)

(52) U.S. Cl.
CPC ..... *H04W 72/543* (2023.01); *H04W 28/0268* (2013.01); *H04W 72/0446* (2013.01)

(58) Field of Classification Search
None
See application file for complete search history.

(56) References Cited

U.S. PATENT DOCUMENTS 7,613,222 B2 11/2009 Reunamaki et al.
2005/0185669 A1 8/2005 Welborn et al.

FOREIGN PATENT DOCUMENTS

WO 2020167222 A2 8/2020
WO 2020167222 A3 10/2020
(Continued)

OTHER PUBLICATIONS

Gopalan, K.S. et al., "Tracking Resurgence of Ultra-Wideband—A Standards and Certification Perspective," 2022 14th International Conference on COMmunication Systems & NETworkS (COMSNETS), Jan. 4-8, 2022, Bangalore, India, IEEE, pp. 894-898.
(Continued)

*Primary Examiner* — Clemence S Han
(74) *Attorney, Agent, or Firm* — Withrow & Terranova, P.L.L.C.

(57) ABSTRACT

Systems and methods for fine ranging (FiRa) slot scheduling in ultra-wideband (UWB) enabled devices are disclosed. In particular, a control circuit may allocate slots within a UWB data phase based on required quality of service (QOS) parameters. More particularly, a control circuit may set up one or more connections based on connection requests that are accompanied by QoS indicators. The control circuit may then allocate slots according to the QoS indicator, where slots are initially allocated to connections with the highest QoS indicator and then allocated through connections with increasingly lower QoS indications. In this manner, the QoS guarantees are satisfied, improving the overall user experience.

18 Claims, 10 Drawing Sheets

(56) References Cited

FOREIGN PATENT DOCUMENTS

| | | | |
|---|---|---|---|
| WO | 2021064102 | A1 | 4/2021 |
| WO | 2021089195 | A1 | 5/2021 |

OTHER PUBLICATIONS

International Search Report and Written Opinion for International Patent Application No. PCT/US2023/013473, mailed Jun. 16, 2023, 17 pages.

Pilakkat, Reena, et al., "Scheduling and power control for MAC layer design in multihop IR-UWB networks," International Journal of Network Management, vol. 20, Issue 1, May 5, 2009, John Wiley and Sons, Ltd., 19 pages.

Extended European Search Report for European Patent Application No. 26181097.2, mailed Jul. 20, 2026, 9 pages.

| Slot Index | Slot allocation | Used for |
|---|---|---|
| 1 | Controlle1 | 1st segment of Authentication Request to Controlee 1 |
| 2 | Controller | 2nd segment of Authentication Request to Controlee 1 |
| 3 | Controller | 1st segment of Authentication Request to Controlee 2 |
| 4 | Controller | 2nd segment of Authentication Request to Controlee 2 |
| 5 | Controlee 1 | ACK of Authentication Request of Controlee 1 |
| 6 | Controlee 2 | ACK of Authentication Request of Controlee 2 |
| 7 | Controller | Opportunity to retransmit a PDU which is not received by a controlee |
| 8 | Controller | Opportunity to retransmit a PDU which is not received by a controlee |
| 9 | | |
| .... | | |
| .... | | |
| 38 | Controlee 1 | 1st Segment of Response of controlee 1 |
| 39 | Controlee 1 | 2nd Segment of Response of controlee 1 |
| 40 | Controller | ACK for Authentication Response of Controlee 1 |
| 41 | Controlee 1 | Opportunity to retransmit a PDU which is not received by the controller |
| 42 | | |
| 43 | | |
| 44 | | |
| 45 | | |
| 46 | | |
| 47 | | |
| 48 | Controlee 2 | 1st Segment of Response of controlee 2 |
| 49 | Controlee 2 | 2nd Segment of Response of controlee 2 |
| 50 | Controller | ACK for Authentication Response of Controlee 2 |
| 51 | Controlee 2 | Opportunity to retransmit a PDU which is not received by the controller |
| 52 | | |

*FIG. 9*

FINE RANGING SLOT SCHEDULER

PRIORITY CLAIMS

The present application is a 35 USC 371 national phase filing of International Application No. PCT/US2023/013473, filed Feb. 21, 2023, which claims priority to U.S. Provisional Patent Application Ser. No. 63/369,110 filed on Jul. 22, 2022, and entitled "FINE RANGING SLOT SCHEDULER," the contents of which are incorporated herein by reference in its entirety their entireties.

PCT application no. PCT/US2023/013473 also claims priority to U.S. Provisional Patent Application Ser. No. 63/312,990 filed on Feb. 23, 2022, and entitled "UWB SLOT SCHEDULER," the contents of which is incorporated herein by reference in its entirety.

RELATED APPLICATION

The present application is related to U.S. Provisional Patent Application Ser. No. 63/306,204 filed on Feb. 3, 2022, and entitled "LINK LAYER CONTROL IN ULTRA WIDEBAND SYSTEMS," the contents of which are incorporated herein by reference in its entirety.

BACKGROUND

I. Field of the Disclosure

The technology of the disclosure relates generally to defining link layers in the Fine Ranging (FiRa) standard for ultra-wideband (UWB) systems.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

One such function is the introduction of fine ranging (FiRa). In April of 2020, the FiRa Consortium published "PHY Technical Requirements," setting forth physical layer (PHY) requirements based on IEEE 802.15.4z standard for ultra-wideband (UWB)-enabled devices. The FiRa Consortium followed this with the publication of "UWB MAC Technical Requirements" in May of 2020. While these two documents set forth requirements to be FiRa-certified UWB-enabled devices, there remains room in these specifications for specific details to be defined, and there is room for data communication protocols to be further defined.

In particular, the FiRa v. 2.0 standard introduced data transfer capability using either a defined message of a ranging round or using a data phase having slots. However, the standard leaves open how the slots within the UWB framework are scheduled, leaving room for innovation related thereto.

SUMMARY

Aspects disclosed in the detailed description include systems and methods for a fine ranging (FiRa) slot scheduler in ultra-wideband (UWB)-enabled devices. In particular, exemplary aspects of the present disclosure allocate slots within a UWB data phase based on required quality of service (QOS) parameters. More particularly, a control circuit may set up one or more connections based on connection requests that are accompanied by QoS indicators. The control circuit may then allocate slots according to the QoS indicator, where slots are initially allocated to connections with the highest QoS indicator and then allocated through connections with increasingly lower QoS indicators. In this manner, the QoS guarantees are satisfied, improving the overall user experience.

In this regard, in one aspect, an integrated circuit (IC) is disclosed. The IC comprises a UWB circuit comprising a control circuit. The control circuit is configured to allocate slots within a UWB data phase based on a QoS indicator for a connection.

In another aspect, a method for allocating slots in a UWB data phase is disclosed. The method comprises receiving multiple connection requests, wherein each connection request has an associated QoS indicator. The method also comprises allocating slots within the UWB data phase based on the associated QoS indicator.

BRIEF DESCRIPTION OF THE DRAWINGS

FIG. 9 shows an example of slot allocation for an Authentication session, including a request and response with two Controlees.

DETAILED DESCRIPTION

Figure 1:
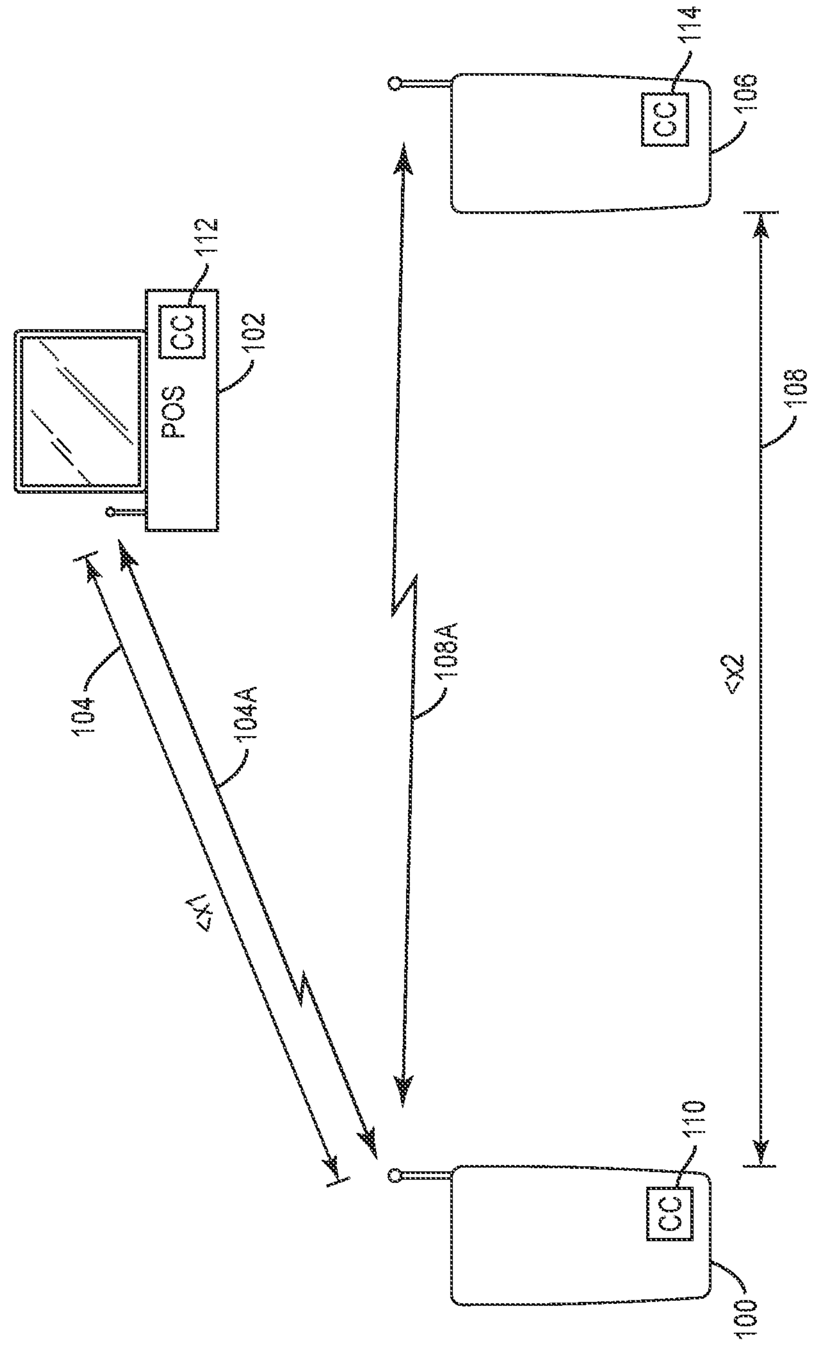
FIG. 1 is a stylized representation of computing devices within a predefined distance such that fine ranging (FiRa) communication may occur.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for a fine ranging (FiRa) slot scheduler in ultra-wideband (UWB)-enabled devices. In particular, exemplary aspects of the present disclosure allocate slots within a UWB data phase based on required quality of service (QOS) parameters. More particularly, a control circuit may set up one or more connections based on connection requests that are accompanied by QoS indicators. The control circuit may then allocate slots according to the QoS indicator, where slots are initially allocated to connections with the highest QoS indicator and then allocated through connections with increasingly lower QoS indicators. In this manner, the QoS guarantees are satisfied, improving the overall user experience.

Before addressing particular aspects of the present disclosure, some additional background information is provided. In particular, the FiRa Consortium has proposed FiRa as a UWB technology that allows connections between peer devices and which allows secure transactions between a controller device and a controlee device when the two are within a predefined distance of each other. Some possible use cases are payment transactions or streaming of content. The current language of the specification calls for a media access control (MAC) layer for inband data transfer and a link layer, but currently, the specification is silent about how to create and manage connections between the controller and controlee(s) or how UWB resources are allocated. Further, the specification is silent about how slots within the UWB framework are assigned to various signals. This silence leads to room for innovation, particularly to help assign slots in a fashion that supports specific QoS metrics.

In this regard, FIG. 1 is a stylized representation of a mobile computing device 100 being within a predefined distance x1 of a computing device 102 (shown generally by line 104) and within a similar predefined distance x2 of a mobile computing device 106 (shown generally by line 108). The computing device 102 and/or the mobile computing device 106 may each be a point of sale (POS) device, a video streaming source, a file transfer source, or the like. As such, with respect to the mobile computing device 100, the computing device 102 and the mobile computing device 106 may be Controllers, and the mobile computing device 100 may be a Controlee within FiRa communications. More specifically, wireless communication signals 104A and 108A may exist between the mobile computing device 100 and the computing device 102 and mobile computing device 106, respectively. While not shown, it is possible that the roles may be changed without departing from the present disclosure, although, in general, two Controlees cannot communicate with one another directly. However, a Controller may communicate with multiple Controlees.

The authors of the present disclosure have proposed, in the related '204 application referenced above, a link layer (LL) control plane to facilitate establishing communication links for the signals 104A, 108A. In particular, the LL control plane acts as a black box to abstract all the UWB logical connection creation and management so that application developers do not have to program such details. It should be appreciated that the mobile computing device 100, the computing device 102, and the mobile computing device 106 may each include a control circuit, such as control circuits 110, 112, 114, respectively, that, with software, implements aspects of the present disclosure.

Figure 2:
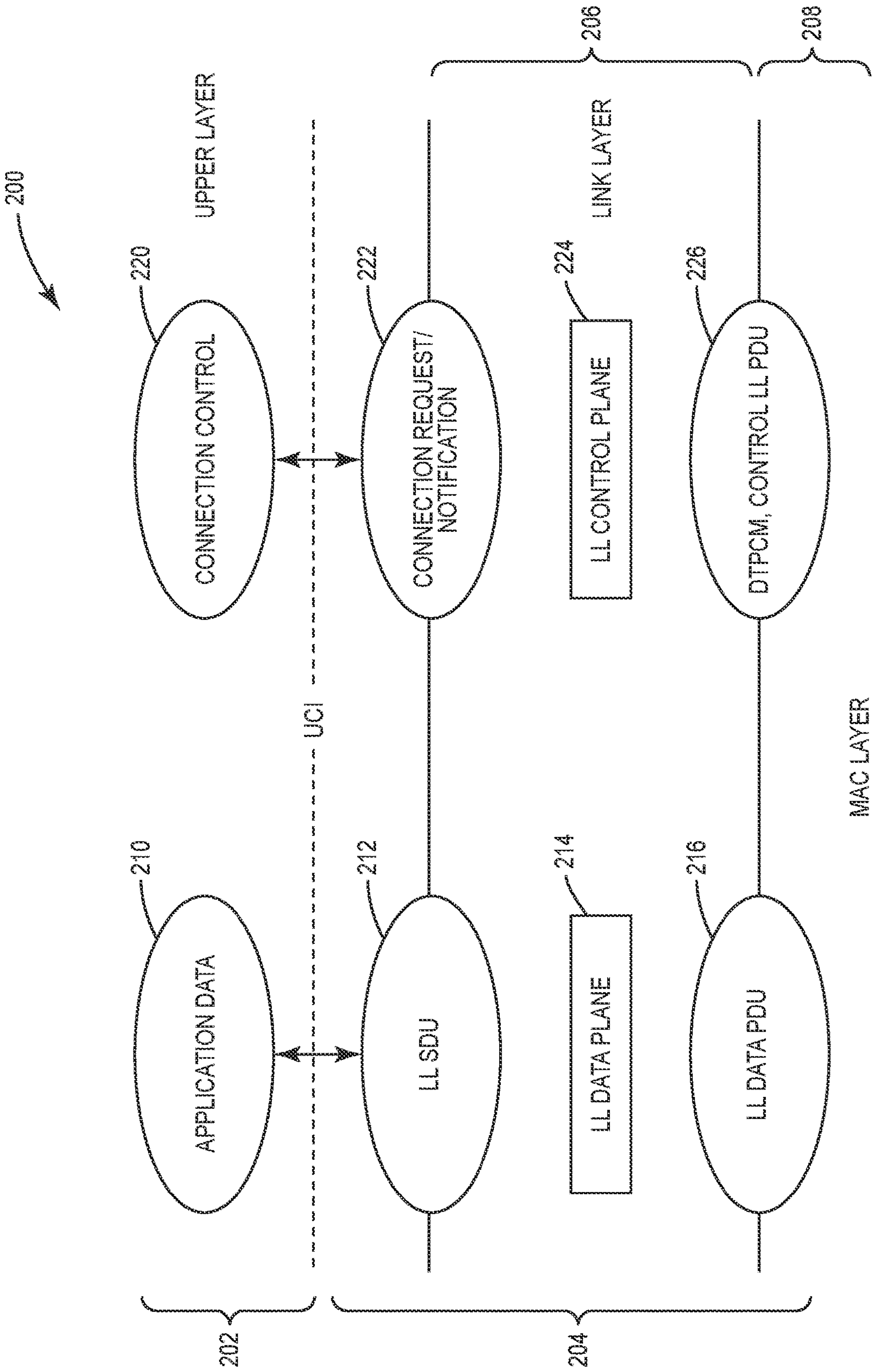
FIG. 2 is a diagram of a protocol stack differentiating link level responsibilities from those of the application layer.

FIG. 2 illustrates a protocol stack 200 with an upper layer 202 and a lower layer 204, separated conceptually by a universal command and control interface (UCI) line. Within the lower layer 204, there is a LL 206 and a MAC layer 208. To assist application developers who want to use FiRa, the UCI line is conceptually above the LL 206. The application developer may designate application data 210, which is passed through the UCI line as a LL service data unit (SDU) 212, where a LL data plane 214 constructs a LL payload data unit (PDU) 216. The application data 210 may also come from or be passed to a secure component across another interface.

With continued reference to FIG. 2, the application developer may also provide basic connection control 220, which includes commands such as create, pause, resume, and delete, but no details about the UWB functionality that performs these commands. Such commands are passed through the UCI line to a connection request/notification function 222 in the LL 206. A LL control plane 224, according to the present disclosure, has two main functions. Specifically, the LL control plane 224 allocates the UWB resources (e.g., UWB slots) between the UWB Controller and the UWB responders (Controlees) and creates the logical connection between the upper layer 202 of the Controller and the Controlees. To do so, the LL 206 may use a bubble 226. The bubble 226 includes a data transmission phase control message (DTPCM) and an LL control PDU. The LL control PDU is the payload of the signaling messages that are conveyed by the MAC layer 208 to create the logical connections.

For the first function, the LL control plane 224 of the Controller considers all the requests of the logical connection creation and also solicits how the upper layer clients (i.e., the application) intend to use the logical connection. Thus, the application developer may designate in the application what the use is as well as whether the connection is unidirectional or bidirectional in the upper layer 202. Additionally, the developer may provide an indication of what a target volume of data to be exchanged is. There may additionally be some indication as to how critical latency is and, if latency is critical, what is a target guaranteed latency. Further, the developer may provide an indication if the bitrate is critical and any guaranteed bitrate. As still another option, the developer may provide an indication as to whether the connection is not critical (e.g., background process) and only uses best effort data transfers.

The developer may also provide an indication as to whether the connection is intended for an authentication request/response application. Authentication request/response applications are different in some ways, such as the responder does not have any data to transmit until after the responder has received and processed the Authentication request. This time waiting for the request may be non-trivial since some cryptographic computation is required. Thus, the developer may provide an indication of the delay between the request and the response (as well as a size for the request and/or response).

In an exemplary aspect, the LL 206 exposes a high-level interface, which abstracts the UWB protocol. The semantics of this interface is relatively simple such that the developer only indicates the change in state of the link (create, pause, resume, delete) for a connection in the current data phase of the ranging round. The developer may also indicate the type of connection (latency critical, best effort, authentication, or bitrate critical) through a QoS class indicator (QCI). Note that this list is not exhaustive, and other QCIs may be used. For example, QCI=1 may be a guaranteed bitrate QoS indicator for streaming use cases; QCI=0 may be a guaranteed latency QoS indicator; QCI=2 may be a best effort QoS indicator for connections such as for a peer-to-peer file transfer; and QCI=3 may be for Authentication connections. Note that the precise assignment of a given number to a given QoS class is arbitrary and may be rearranged without departing from the present disclosure (e.g., guaranteed latency may be QCI=0).

Having provided a QCI, the developer may have to provide additional information such as for QCI=1, the developer may specify a target bitrate and a disorder metric (i.e., how many frames can be received out of order and still allow the receiving application to reorder them with no noticeable impact on the user experience). For guaranteed latency connections, the developer may also specify a maximum size of the burst data and an amount of data being transmitted. Note that the list of QCIs is not exclusive, and there may be other sorts of auxiliary information provided by the application developer.

Table 1 provides details about a logical connection creation:

TABLE 1

Logical Connection Creation

| PARAMETERS | COMMENTS |
|---|---|
| Connection ID | |
| Direction | Bidirectional or unidirectional<br>If unidirectional, it defines the data direction (Controller -> Controlee or Controlee -> Controller) |
| QCI + QoS attributes | QCI = 0, 1, 2, or 3<br>If 0, QoS attribute = target latency<br>If 1, QoS attribute = target bitrate<br>If 3, QoS attributes = delay between Request and Response and/or a response size |

Table 2 provides details about a logical connection deletion:

TABLE 2

Logical Connection Deletion

| PARAMETERS | COMMENTS |
|---|---|
| Connection ID | |

For the second function (i.e., create the connection), the LL control plane 224 of the Controller uses this interface to create the UWB logical connections. The LL control plane 224 relies on radio data bearers between the UWB link layer entities to establish a logical connection between upper layers 202. The LL control plane 224 of the Controller creates two radio data bearers per connection: one bearer from Controller to Controlee and one bearer from Controlee to Controller. The bearer carries either LL data, LL acknowledgments (ACKs), or both, as shown in Table 3.

TABLE 3

Data Bearer content

| Upper Layer | LL DATA BEARERS | |
|---|---|---|
| Connection | Controller to Controlee | Controlee to Controller |
| Controller to Controlee only | Upper Layer data | LL ACK Status (for received LL data Controller to Controlee) |
| Controlee to Controller only | ACK status (for received LL data Controlee to Controller) | Upper Layer data |
| Bidirectional | Upper Layer data<br>ACK status (for received LL data Controlee to Controller) | Upper Layer data<br>ACK status (for received LL data Controller to Controlee) |

The concept of the data bearer to establish different connections makes the overall system very compact and reduces LL overhead in the data transfer itself. That is, every bearer has some attributes (e.g., a bearer that carries data has a transmit window and a maximum retransmission number; a bearer that carries only ACKs does not). These bearer parameters are determined by the LL control plane 224 of the Controller from the connection QCI and auxiliary information.

For example, for a QCI=0 connection, the maximum retransmission number of the associated bearers is small, whereas, for a QCI=2, the maximum retransmission number of the associated bearers is greater (to increase the bearer reliability). Once these bearer attributes are determined and once the LL control plane 224 of the Controller has allocated the internal resources of the UWB (buffer allocation to manage the transmit window, management of identifiers in the pool of identifiers, and the like), the LL control plane 224 builds and sends a control LL PDU (i.e., one element of bubble 226) "create connection" as shown in Table 4. This control LL PDU is sent over a signaling bearer which is a broadcast bearer. Each connection may be individually configured with a connection descriptor.

TABLE 4

CONTROL LL PDU: CREATE CONNECTION

| Field | Field content | Comment |
|---|---|---|
| Header | Bearer ID = 0<br>Signalling Information = "Create Connection" | Signalling bearer |
| Number of Connections | N | |
| List of N connections | Connection ID | |
| Connection description | Bearer ID Controller to Controlee<br>Bearer ID Controlee to Controller | ID of bearers which are mapped to the connection |
| | LL addresses and endpoints | Address of Controlees and endpoints |
| | Max Retransmission number | Determined by LL Control Plane from QCI and QoS attributes |
| | Tx window | Determined by LL Control Plane from QCI and QoS attributes |
| | Packet concatenation or segmentation enabled | |

Figure 3:
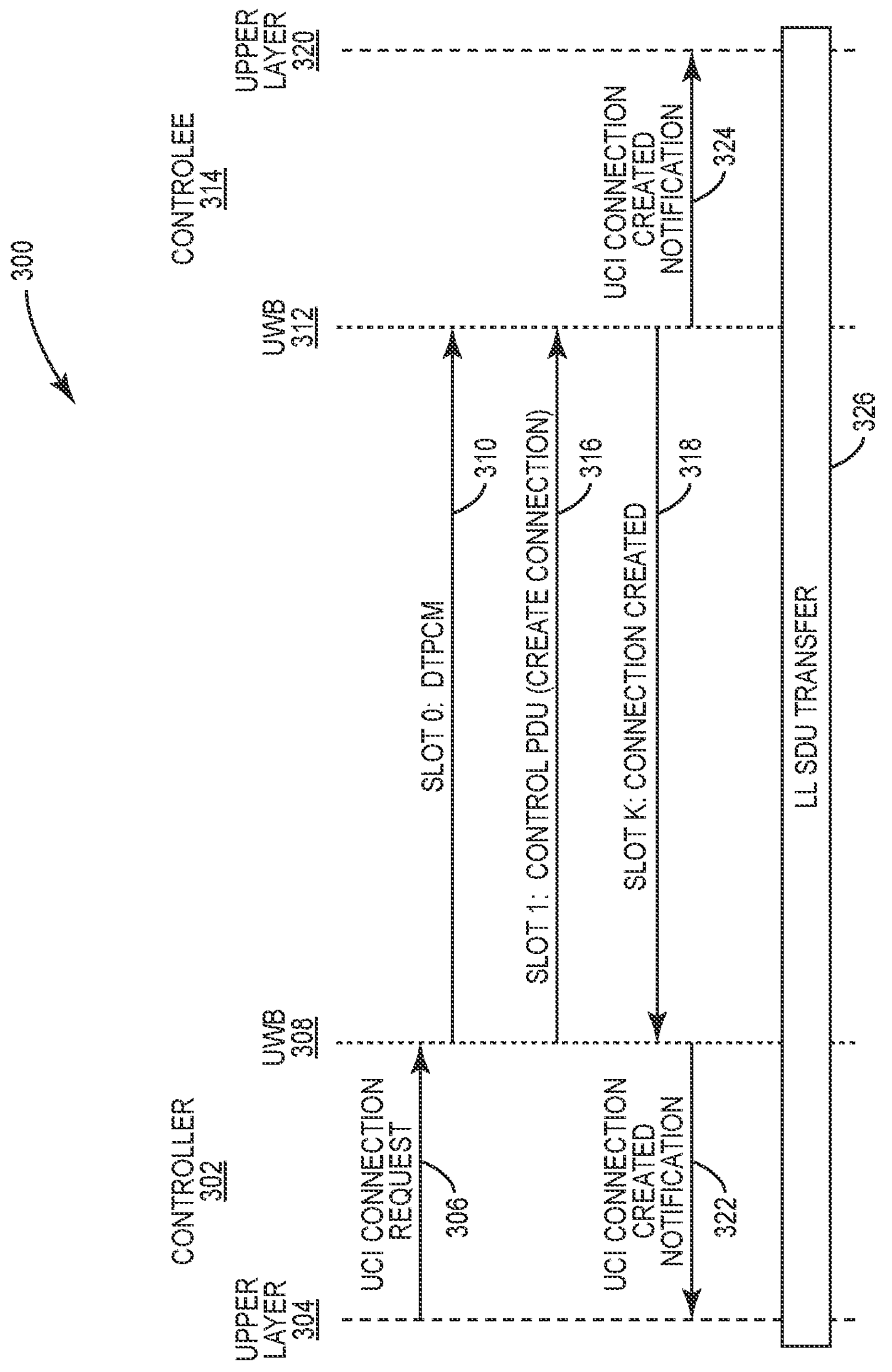
FIG. 3 is a signal flow diagram between the Controller of a FiRa communication and a Controlee.

FIG. 3 illustrates a signal flow 300 for connection creation. In a Controller 302, an upper layer 304 passes a UCI connection request 306 to a UWB system 308. The wireless transceiver within the UWB system 308 sends at slot zero a signal 310 with a DTPCM to a UWB system 312 in a Controlee 314. The DTPCM determines the UWB slot allocation. The UWB system 308 sends at a slot one a signal 316 with a control PDU that has a create connection command. The Controlee 314 responds with a later slot k signal 318 to the Controller 302, indicating creation of the connection by using a control PDU over a signaling bearer with identifier one. The respective UWB systems 308 and 312 inform upper layers 304 and 320, respectively, of the connection creation through UCI 322, 324, respectively. Afterward, data transfer may occur through a LL SDU transfer 326.

Table 5 provides a possible structure for the control PDU to acknowledge successful connection creation.

TABLE 5

Control PDU (create connections)

| Field | Field content | Comment |
|---|---|---|
| Header | Bearer ID = 1<br>Signalling Information = "Created Connection" | Signalling bearer |
| Connection ID | ID of the created connection | |

Figure 4:
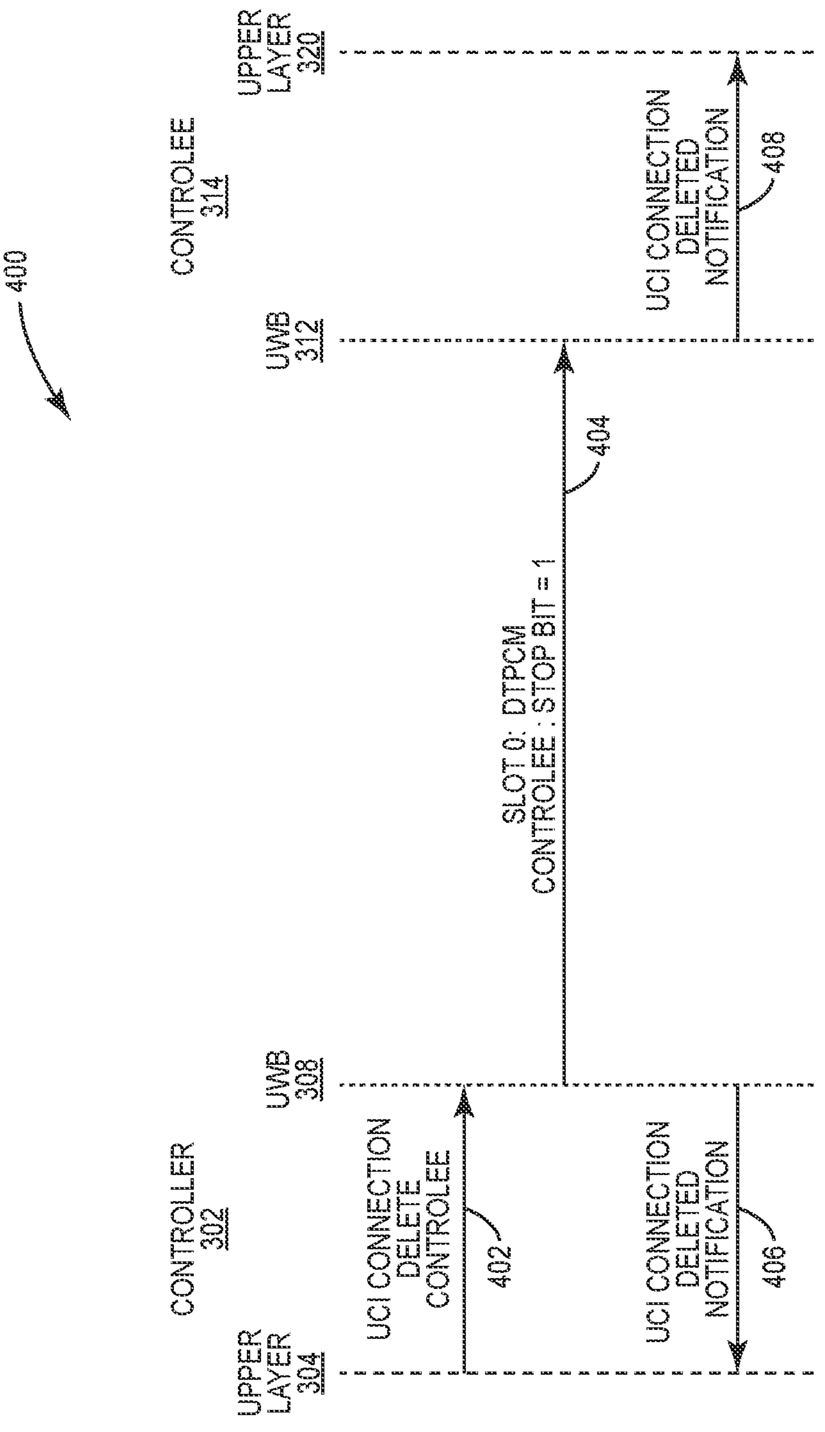
FIG. 4 is a signal flow diagram showing connection creation between the Controller and Controlee.

The Controller 302 host may want to stop a connection after the upper layer 304 has finished its transaction or because the UWB link is broken. When the LL control plane 224 of the Controller 302 receives this information over the interface, it does not allocate UWB slots to this device and sends a stop bit in a MAC control message which is sent as better seen by signal flow 400 in FIG. 4.

Specifically, the upper layer 304 detects a broken link or completed transaction and sends a UCI connection delete command signal 402 that identifies a particular Controlee 314 to the UWB system 308. The UWB system 308 sends a signal 404 containing a new DTPCM identifying the Controlee 314 and a stop bit for the concerned Controlee. After, both UWB systems 308 and 312 send a UCI connection deleted notification 406, 408, respectively.

Other signal formats may be possible. However, the examples provided herein allow for easy integration since the application developer uses an abstracted API to create and control connections with a semantic approach. The signaling is compact and has low overhead while also allowing for different QoS demands to be met.

Figure 5:
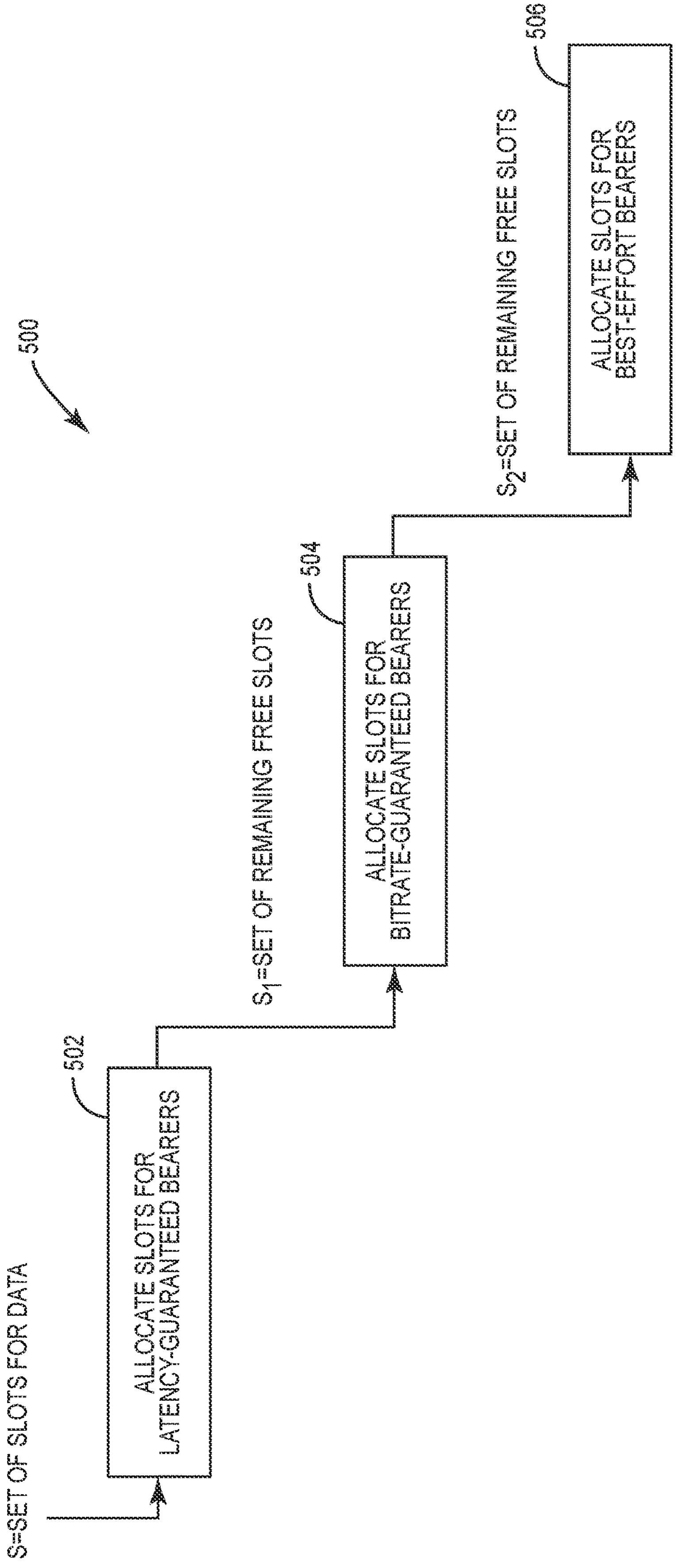
FIG. 5 is a flowchart showing how slots in the ultra-wideband (UWB) framework are assigned for FiRa.

In addition to identifying the different QoS demands, exemplary aspects of the present disclosure provide a way to schedule slots in the UWB framework that help meet the identified QoS demands. In this regard, FIG. 5 illustrates a process 500 for generally allocating slots. In particular, the process 500 begins by knowing how many slots S are present in the data phase and how many different connections have to be made according to the LL configuration parameters. That is, the control circuit knows the QCI and can get or determine the LL configuration parameters. The process 500 continues by allocating slots for latency-guaranteed bearers (e.g., QCI=0) (block 502). This leaves a set $S_1$ of remaining unused slots. Within $S_1$, the process 500 allocates slots for bitrate-guaranteed bearers (e.g., QCI=1) (block 504). This leaves a set $S_2$ of remaining unused slots. Within $S_2$, the process 500 allocates slots for best effort bearers (e.g., QCI=2) (block 506). In the case of an Authentication session, there are typically no latency-guaranteed bearers, nor are there bitrate-guaranteed bearers. Accordingly, these slots may be allocated first (i.e., before block 502), last (i.e., after block 506), or anywhere between as needed or desired based on the relative priority of Authentication sessions. However, given the delay that may occur while cryptographic computation occurs, it may provide a better user experience to prioritize Authentication sessions first.

Figure 6:
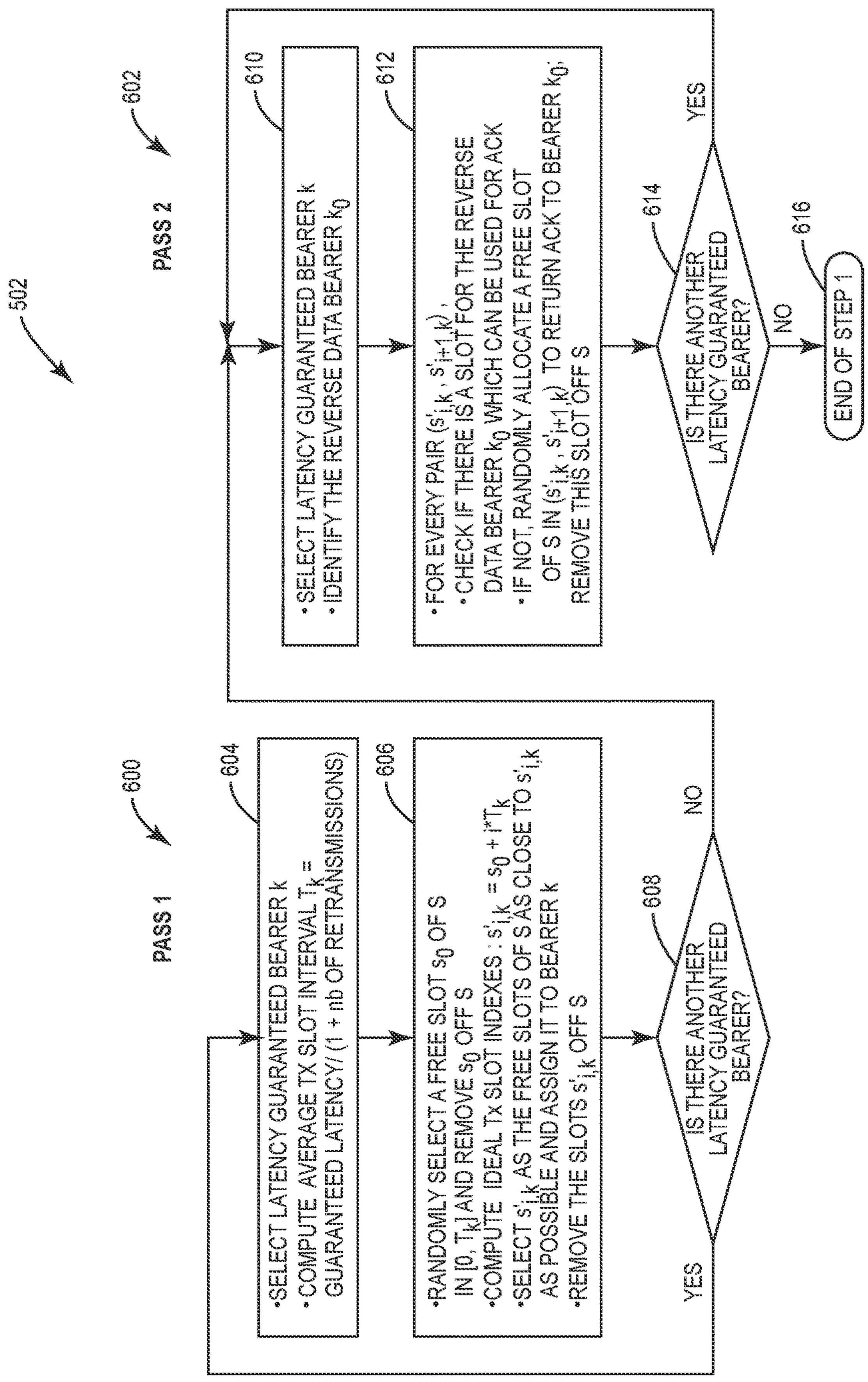
FIG. 6 is a flowchart showing specifically how slots are assigned for latency-sensitive signals.

FIG. 6 provides details about block 502. Specifically, block 502 uses a two-step process. Specifically, the step of block 502 may be conceptually split into two steps or passes 600, 602. In a first pass 600, a control circuit of the Controller (e.g., control circuit 112 of the computing device 102) may select a latency-guaranteed bearer k and compute an average transmit slot interval (block 604). This interval $T_k$ may be expressed as:

$$\frac{\text{guaranteed latency}}{(1+\text{number of retransmissions})}$$

The control circuit may randomly select a free slot $s_f$ within set S within $[0,T_k]$, and $s_f$ is removed from the set S. Further, the control circuit may compute an ideal transmit slot index $s_{i,k}=s_f+i*T_k$ of slots of S. Then the control circuit may select a subset $s'_{i,k}$ as the free slots of S as close to $s_{i,k}$ as possible and assign the slot or slots to bearer k. Then, the slots $s'_{i,k}$ are removed from the set S (block 606).

The control circuit may then determine if there is another latency-guaranteed bearer (block 608). If the answer to block 608 is yes, the process returns to block 604 for the next latency-guaranteed bearer (i.e., stepping through the k latency-guaranteed bearers). If, however, the answer to block 608 is no, the process moves to the second pass 602.

The second pass 602 begins by selecting the latency-guaranteed bearer k and identifying a reverse data bearer $k_0$ (block 610). It should be appreciated that the reverse data bearer $k_0$ is a bearer with swapped source and destination addresses relative to the original bearer k. For every subset pair $(s'_{i,k}\ s'_{i+1,k})$, the control circuit checks if there is a slot for the reverse data bearer $k_0$, which can be used for acknowledgment (ACK) signals. If there is no such slot for ACK signals, the control circuit may randomly allocate a free slot within the set S, and more particularly within subsets $(s'_{i,k}, s'_{i+1,k})$ to return an ACK signal to the bearer $k_0$ and the assigned slot is removed from the set S (block 612).

The control circuit determines if there is another latency-guaranteed bearer (block 614). If the answer at block 614 is no, then the second pass 602 ends (block 616), and the process 500 increments to block 504 (see FIG. 7). If, however, the answer at block 614 is yes, then the process returns to block 610 and steps through the latency-guaranteed bearers.

Figure 7:
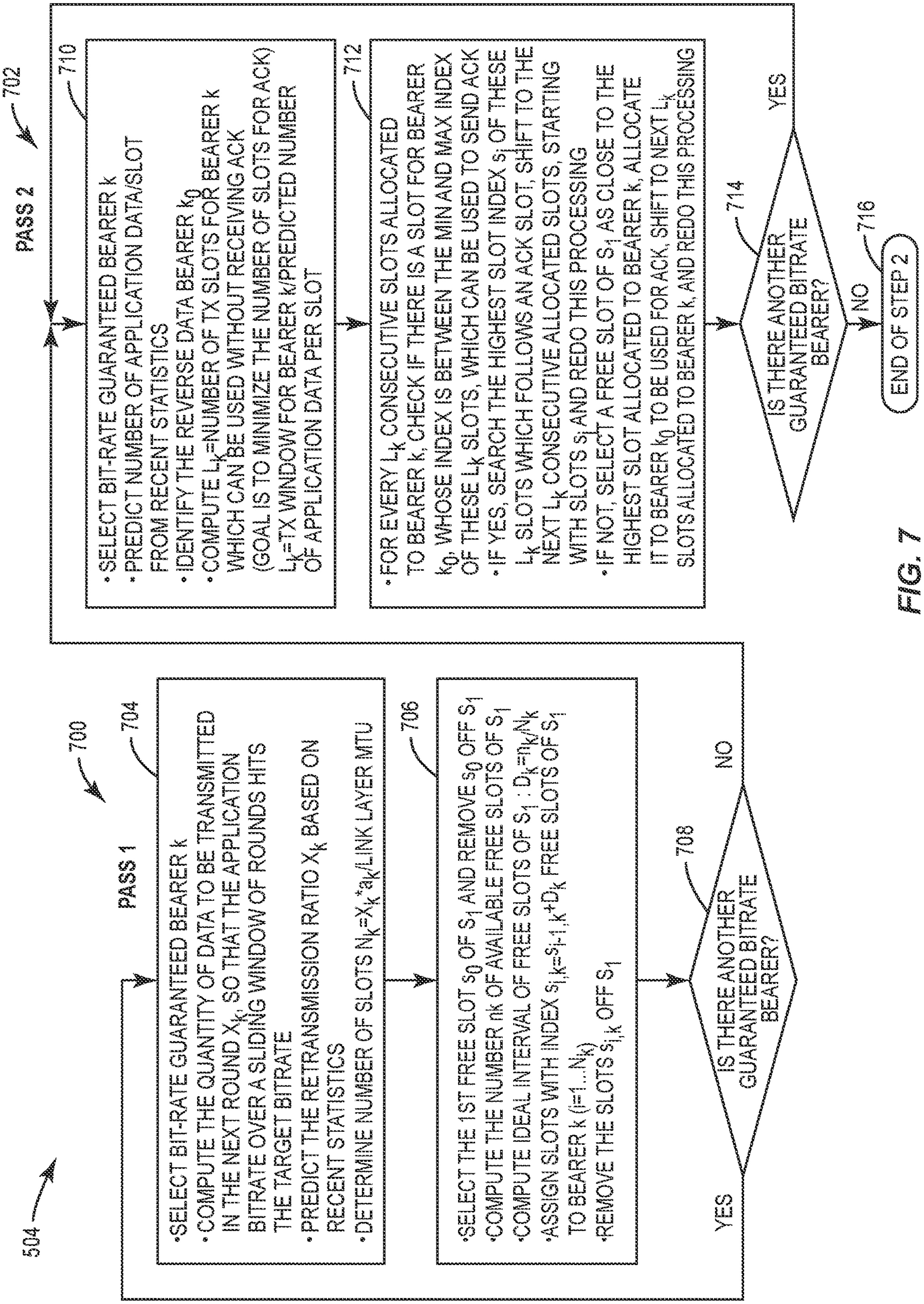
FIG. 7 is a flowchart showing specifically how slots are assigned for bitrate-sensitive signals.

FIG. 7 illustrates greater detail about block 504. Again, the block 504 may be conceptually split into two passes 700, 702. The first pass 700 begins by selecting a bitrate-guaranteed bearer k. From the chosen bitrate-guaranteed bearer, the control circuit may compute a quantity of data to be transmitted in the next data phase $X_k$ so that the application bitrate over a sliding window of data phases achieves the target bitrate. The control system may further predict a retransmission ratio $a_k$ based on recent statistics associated with the communication channels. Based on this, the control system may determine a number of slots ($N_k$) to meet the bitrate guarantee (block 704). This determination may be calculated as follows (where MTU is maximum transmission unit):

$$L_k=\frac{\text{transmit window for bearer } k}{\text{predicted number of application data per slot}}$$

The control system may then select the first free slot $s_f$ of the set S1 and remove $S_{f1}$ from the set S1. The control system may compute a number $n_k$ of available free slots in $S_1$ and an ideal interval of free slots ($D_k$) of the set $S_1$, where $D_k=n_k/N_k$. The control circuit may then assign slots with an index of $s_{i,k}=s_{i-1,k}+D_k$ free slots of set $S_1$ to the bearer k, where i is between 1 and $N_k$. The assigned slots are then removed from the set $S_1$ (block 706). The control circuit may then determine if there is another bitrate-guaranteed bearer (block 708). If the answer is yes, then the first pass 700 is repeated. If, however, the answer to block 708 is no, then the second pass 702 begins.

In the second pass 702, the control circuit selects a bitrate-guaranteed bearer k and predicts a number of application data slots from recent statistics. Then, the control system may identify a reverse data bearer $k_0$ and compute $L_k$ corresponding to a number of transmit slots for the bearer k, which can be used without receiving an ACK signal (block 710). Conceptually, it may be more efficient to minimize a number of slots for ACK responses.

$$N_k=\frac{X_k*a_k}{\text{Link Layer } MTU}$$

For every $L_k$ slot allocated to bearer k, starting with a slot whose index is $s_i$, $s_i$, $=s_{i(LK)}$ is the index of the $L_k^{th}$ slot assigned to the bearer k following the slot $s_i$. The control circuit may check to see if there is a slot between $s_i$ and $s_{j(LK)}$ for bearer $k_0$, which can be used to send an ACK response. If the answer is yes, then the control circuit selects the highest slot index $s_m$, which satisfies this condition, and it may search for the highest slot index $s_j$ of these $L_k$ allocated slots so that $s_j>=s_m$, and redo this processing starting with new slot $s_j$. If the answer is no, a free slot of the set $S_1$, as close to the highest slot allocated to the bearer k (i.e., as close to $s_{i(LK)}$), is allocated to bearer $k_0$ to be used for an ACK response; the control circuit shifts to the next $L_k$ slots allocated to the bearer k, starting with slot index$>s_{i(LK)}$, and redo this processing (block 712).

Once processing is completed, the control circuit may determine if there is another bitrate-guaranteed bearer (block 714). If the answer is yes, the process returns to block 710. If the answer is no, then the process ends (block 716), and the process 500 moves to block 506 (see FIG. 8).

Figure 8:
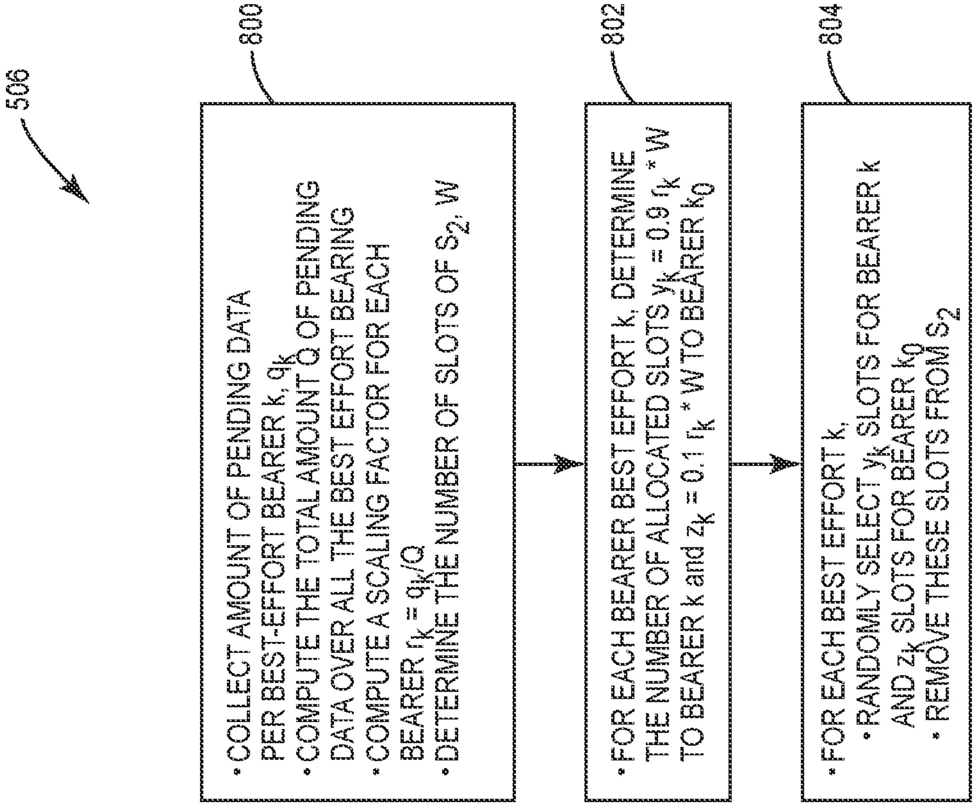
FIG. 8 is a flowchart showing specifically how slots are assigned for best effort signals.

FIG. 8 illustrates additional details about block 506 for best effort QoS. The control circuit collects an amount of pending data per best effort bearer k (call this data $q_k$) and computes a total amount Q of pending data over all the best effort bearers. The control system may compute a scaling factor for each bearer $r_k=q_k/Q$ and determine a number of slots in $S_2$ (call this number W) (block 800).

The control system may, for each best effort bearer k, determine a number of allocated slots $y_k=0.9*r_k*W$ to bearer k and $z_k=0.1*r_k*W$ to bearer $k_0$ (block 802).

For each best effort bearer k, the control circuit may randomly select $y_k$ slots for bearer k and $z_k$ slots for bearer $k_0$. These slots are removed from set $S_2$ (block 804).

Using the process 500, the highest QoS indicator receives the first allocation of slots, the next highest QoS indicator receives the next allocation of slots, and best-effort gets any slots that are remaining. This process 500 thus helps meet the guaranteed QoS.

Figure 10:
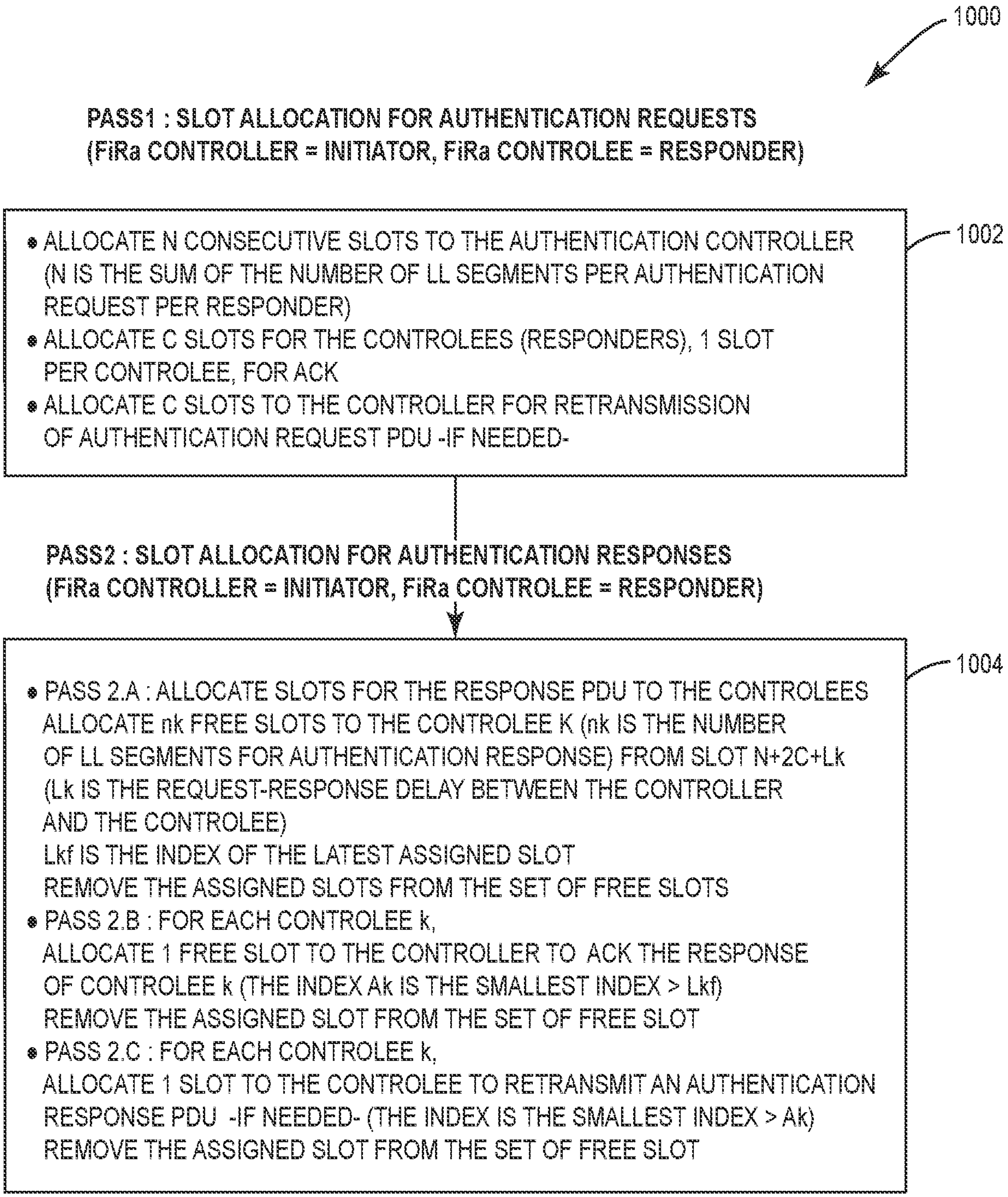
FIG. 10 shows the process of slot allocation for such an Authentication session.

FIG. 9 shows an example of slot allocation for an Authentication session, including a request and response with two Controlees. Note that this slot allocation table may be the result of a process 1000 set forth in FIG. 10. Thus, FIG. 10 shows a process 1000 of slot allocation for such an Authentication session.

In a first pass (block 1002), the process 1000 allocates N consecutive slots to send the Authentication Requests. $n_k$ is the number of Authentication segments to transmit the complete Authentication Request to Controlee k. $n_k$ is determined from the attribute Authentication Request size $$n_k = \frac{\text{Authentication Request Size}}{LL\ MTU\ \text{size}}$$

The slots 1 to N are allocated to the Controller so that it can send sequentially the Authentication Requests to all the Controlees, where N is:

$$N = \sum_k n_k$$

Then one slot is allocated to each Controlee so that it can acknowledge the received Authentication Request PDUs, in the same order as the Authentication requests have been sent. Then C slots are allocated to the Controller as opportunities to retransmit a PDU which is not received by a Controlee (where C is the number of Controlees present in the session).

In a second pass (block 1004), the slots are allocated to send the Authentication Responses.

In a worst case, the Authentication Request is fully received by any Controlee at slot N+2C. $T_k$ is the maximum processing delay of the Controlee k to process the Authentication request and prepare the response. The Controlee k is ready to send its response at slot $L_k$=N+2C+$T_k$/slot duration in a worst case, where $T_k$ is a QoS attribute of the connection provided by the Upper Layer in the logical connection creation command.

For each Controlee k, the process 1000 allocates $n_k$ slots in the set of free slots, in ascending order, with slot index>$L_k$. The allocated slots are removed from the set of free slots. $L_{k,f}$ is the last allocated slot. Then for each Controlee k, the process 1000 allocates one slot to the Controller in the set of free slots so that the Controller can acknowledge the received PDUs of the Authentication response of the Controlee k: its slot index $A_k$ is the smallest index larger than $L_{k,f}$.

Then for each Controlee k, the process 1000 allocates one slot to the Controlee k in the set of free slots so that it can retransmit a negatively acknowledged segment. Its slot index is the smallest index larger than $A_k$. At the end of the process 1000, a table of slot allocations, such as shown in FIG. 9, may be created and used. Note that other slot allocations may be the end result of the process 1000, and FIG. 9 is intended to be illustrative only.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. An integrated circuit (IC) comprising:

an ultra-wideband (UWB) circuit comprising a control circuit configured to:

allocate slots within a UWB data phase based on a quality of service (QoS) indicator for a connection;

allocate others of the slots within the UWB data phase for other multiple connections based on differing QoS indicators; and allocate still others of the slots for Authentication requests to multiple responders; and allocate a different others of the slots for the multiple responders to send authentication responses.

2. The IC of claim 1, wherein the control circuit is further configured to receive the QoS indicator from an application layer.

3. The IC of claim 2, wherein the control circuit is configured to receive the QoS indicator through a link layer.

4. The IC of claim 1, wherein the control circuit is further configured to prioritize slots for connections having a guaranteed latency QoS indicator.

5. The IC of claim 4, wherein the control circuit is further configured to prioritize slots for connections having a guaranteed bitrate QoS indicator below those connections having the guaranteed latency QoS indicator.

6. The IC of claim 5, wherein the control circuit is further configured to allocate slots to a best effort QoS indicator using slots remaining after allocation to connections having higher QoS indicators.

7. The IC of claim 6, wherein the control circuit is further configured to allocate slots for acknowledgment (ACK) responses for connections having the best effort QoS indicator.

8. The IC of claim 5, wherein the control circuit is further configured to allocate slots for acknowledgment (ACK) responses for connections having the guaranteed bitrate QoS indicator.

9. The IC of claim 8, wherein the control circuit is further configured to allocate slots to multiple connections having the guaranteed bitrate QoS indicator before allocating slots for the ACK responses.

10. The IC of claim 9, wherein the control circuit is further configured to allocate slots in two passes, where a first pass allocates at least one slot for transmission and a second pass allocates at least one slot for ACK responses, wherein the first pass is based on a predicted number of retransmissions and the second pass is based on minimizing a number of slots for the ACK responses.

11. The IC of claim 10, wherein the control circuit is further configured to allocate slots in the second pass in such a way that a minimum number of slots per sliding receive widow is assigned for the ACK responses.

12. The IC of claim 4, wherein the control circuit is further configured to allocate slots for acknowledgment (ACK) responses for the connections having the guaranteed latency QoS indicator.

13. The IC of claim 12, wherein the control circuit is further configured to allocate slots to multiple connections having the guaranteed latency QoS indicator before allocating slots for the ACK responses.

14. The IC of claim 13, wherein the control circuit is further configured to allocate slots in two passes, where a first pass allocates at least one slot for transmission and a second pass allocates at least one slot for the ACK responses, wherein the first pass is based on an assigned maximum number of retransmissions and wherein the second pass is based on a requirement that there is one ACK opportunity before transmission of new data.

15. The IC of claim 11, wherein the control circuit is further configured to allocate slots in the first pass so that up to N times the new data is sent in a time window whose length is less than a target latency.

16. The IC of claim 1, wherein the control circuit is further configured to allocate slots in two passes, where a first pass allocates slots for authentication requests, acknowledgments to authentication requests, and retransmissions; and a second pass allocates slots for authentication responses, acknowledgments to authentication responses, and retransmissions of authentication responses.

17. The IC of claim 16, wherein the control circuit is further configured to consider a response delay during allocation of the slots of authentication responses in the second pass.

18. A method for allocating slots in an ultra-wideband (UWB) data phase, the method comprising:

receiving multiple connection requests, wherein each connection request has an associated quality of service (QoS) indicator; and allocating slots within the UWB data phase based on the associated QoS indicator;

allocating others of the slots for Authentication requests to multiple responders; and allocating still others of the slots for the multiple responders to send authentication responses.

* * * * *